July 14, 1970     I. M. MANSSON     3,520,633
SUPPLY LINE COUPLINGS FOR A POWER MEDIUM BETWEEN
SUPPLY LINES AND A TURBINE
Filed May 16, 1968
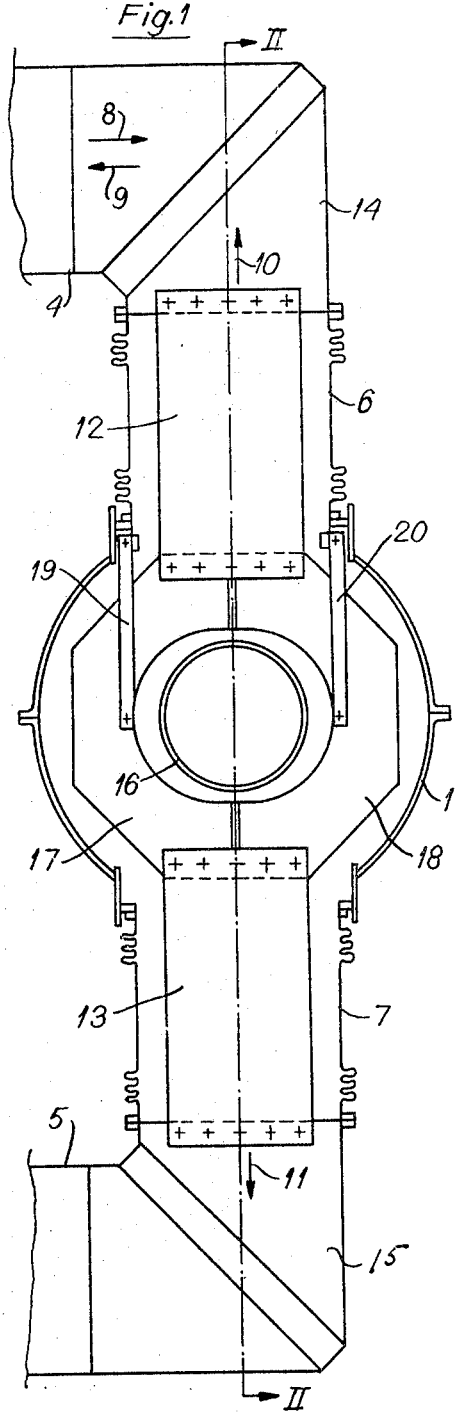
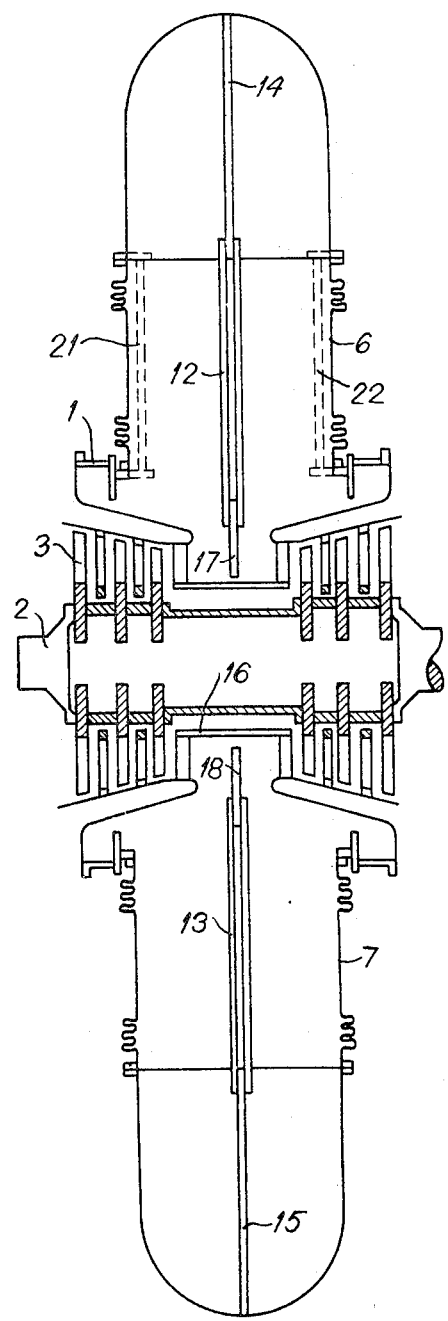
Ivar Martin Mansson
By Eric Y. Munson
Attorney

United States Patent Office

3,520,633
Patented July 14, 1970

---

3,520,633
SUPPLY LINE COUPLINGS FOR A POWER MEDIUM BETWEEN SUPPLY LINES AND A TURBINE
Ivar Martin Mansson, Finspong, Sweden, assignor to Stal Laval, Finspong, Sweden, a Swedish corporation
Filed May 16, 1968, Ser. No. 729,780
Claims priority, application Sweden, July 11, 1967, 10,437/67
Int. Cl. F01d 25/28
U.S. Cl. 415—134                                                 5 Claims

ABSTRACT OF THE DISCLOSURE

An arrangement for steam or gas turbines in which lines or conduits for the supply of the steam or gas to the turbine are disposed diametrically opposite to one another, said lines being connected to the turbine by expansion bellows and by tension force absorbing means situated in the bellows and in the turbine housing, with the connections between the bellows and housing and between the tension force absorbing means and the housing permitting relative movement between the housing and the supply lines.

---

This invention relates to an arrangement employed in steam or gas turbines and has two approximately diametrically opposed lines or conduits for supplying power medium to the turbine, and is mainly characterized in that the lines or conduits are connected to the turbine by means of expansion bellows directed substantially radially to the turbine, and the lines are joined by a tension or traction force absorbing device situated in the bellows and in the turbine housing and designed so as to permit relative movement between the turbine housing and the supply lines.

Reference is to be had to the accompanying drawing wherein an illustrative embodiment of the invention is disclosed and in which FIG. 1 is a cross sectional view of a turbine constructed in accordance with the invention and FIG. 2 is a longitudinal sectional view, taken substantially in the line 2—2 of FIG. 1, looking in the direction of the arrows.

Referring to the drawing, 1 indicates a turbine housing which encloses a turbine shaft 2 provided with the rings of blades shown at 3. An operating or power medium, such as steam or gas, is passed to the turbine through two diametrically opposed horizontal lines or conduits 4 and 5, which are connected to the turbine by means of expansion bellows 6 and 7 extending radially relatively to the turbine. These bellows 6 and 7 permit relative movement of the turbine housing and the supply lines or conduits, occurring as a result of variations in the temperature of the power medium. For example, in the case of a stationary turbine housing, the supply lines or conduits 4 and 5 can move freely in the direction of the arrows 8 and 9.

The pressure acting on the operating medium in the bellows 6 and 7 and in the supply lines 4 and 5 attempts to separate the lines or to move them away from each other. To absorb these forces in the direction of the arrows 10 and 11 the lines or conduits 4 and 5 are connected with a tension absorbing device situated in the bellows and in the turbine housing. This device is composed of plates 12 and 13 positioned radially relatively to the turbine and fixed by means of bolts to plates 14 and 15 which are attached to the supply lines 4 and 5. The plates 12 and 13 extend inwardly to the proximity of a drum 16 which encircles the turbine shaft 2 and are connected to each other by means of the members shown at 17 and 18. Said members are so designed that there is space for movement between the parts and the drum 16.

The lines or conduits and the tension absorbing device are dependingly supported by links or pendulems 19 and 20 pivotally connected to the turbine housing. An alternative arrangement is shown in dotted lines in FIG. 2, and comprises pressure-absorbing rods 21 and 22 secured between the turbine housing and the supply line 4. The ends of the rods 21 and 22 are preferably designed to follow a circular line. By positioning the tension-absorbing device in the bellows and in the turbine housing, good contact is obtained between said device and the power medium, whereby the tension-absorbing device is able to sense the temperature of said medium rapidly. The arrangement described is also such that relative movement between the turbine housing and the supply lines accurring as a result in temperature variations in the power medium, is permitted.

What is claimed is:
1. An arrangement for use in steam or gas turbines having approximately diametrically opposed means for supplying power medium to the turbine contained in a housing, said power supply means being connected to the turbine by expansion bellows, which bellows extend substantially radially to the turbine, tension force absorbing means situated in the bellows and in the turbine housing, said tension force absorbing means, comprising members extending substantially radially relative to the turbine, said members being connected at their outer ends to the respective power supply means and being interconnected at their inner ends by means surrounding the turbine shaft, said last-mentioned means being connected to the turbine housing by means permitting movement of said tension absorbing means relative to the housing.

2. An arrangement according to claim 1 in which the the tension force absorbing means are pivotally suspended from the turbine housing.

3. An arrangement according to claim 1 in which the tension force absorbing means are connected to the turbine housing pressure absorbing members.

4. An arrangement according to claim 1, wherein the lines and the tension absorbing device are dependingly supported by links pivotally mounted in the turbine housing.

5. An arrangement according to claim 1, wherein the lines and the tension absorbing device are supported by pressure absorbing rods extending between the turbine housing and the power lines situated above the housing.

References Cited

UNITED STATES PATENTS

| | | |
|---|---|---|
| 3,043,559 | 7/1962 | Bauer et al. |
| 3,169,749 | 2/1965 | Harris. |
| 3,313,517 | 4/1967 | Hanschke et al. |
| 3,408,045 | 10/1968 | Hart. |

FOREIGN PATENTS

| | | |
|---|---|---|
| 931,583 | 11/1947 | France. |
| 129,583 | 7/1919 | Great Britain. |
| 615,392 | 1/1961 | Italy. |
| 302,648 | 10/1965 | Netherlands. |

EVERETTE A. POWELL, Jr., Primary Examiner